May 1, 1928.  1,668,178

R. A. WEINHARDT

MOTOR VEHICLE

Filed April 9, 1926  2 Sheets-Sheet 1

INVENTOR
Robert A. Weinhardt
BY Harold E. Stonebraker,
his ATTORNEY

May 1, 1928.　　　　　　　　　　　　　　　1,668,178
R. A. WEINHARDT
MOTOR VEHICLE
Filed April 9, 1926　　　　2 Sheets-Sheet 2
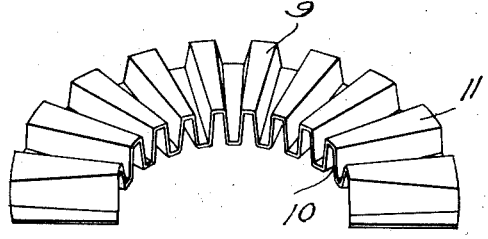
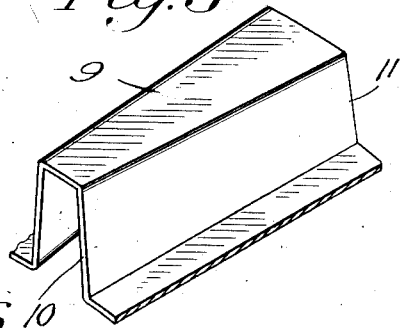
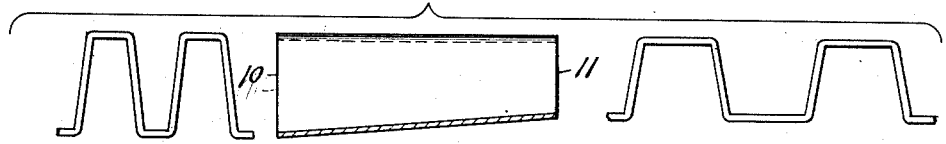
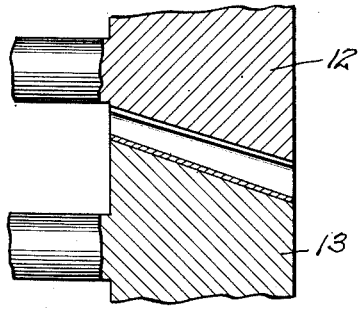
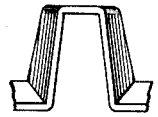
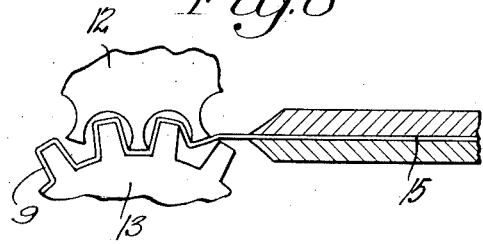
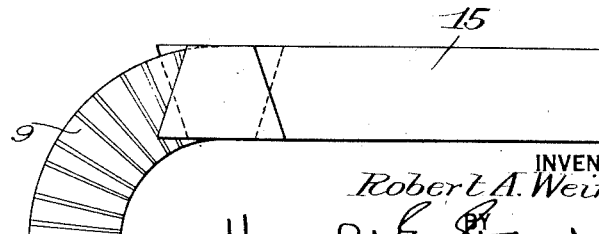
INVENTOR
Robert A. Weinhardt
BY Harold R. Stonebraker
his ATTORNEY Patented May 1, 1928.

1,668,178

UNITED STATES PATENT OFFICE.

ROBERT A. WEINHARDT, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed April 9, 1926. Serial No. 100,914.

This invention relates to a motor vehicle, with particular reference to the general type of suspension illustrated in Adams Patent No. 1,515,716, November 18, 1924, in which a rubber block is clamped between a frame and connecting arm, and has groove and rib connection with said parts, the connecting arm being associated with the axle so as to support the frame.

One object of the invention is to provide sheet metal retainers for the rubber block, of a shape that can be manufactured easily and economically, and lends itself to a strong, durable construction.

Another purpose of the invention is to construct the rubber block so as to produce maximum efficiency by forming the ribs and grooves higher and narrower at their inner ends where greatest torque occurs, and wider and shorter at their outer ends where the torque is less.

An additional object of the improvement is to afford a sheet metal retainer of a form that requires a minimum amount of stock to manufacture, while the resultant product is of substantially uniform thickness throughout and conjugate to the grooves and ribs on the rubber block.

To these and other ends, the invention comprises, in a preferred embodiment, the construction and arrangement that will appear from the following description, when read in conjunction with the accompanying drawings, the novel features being pointed out in the claims following the description.

In the drawings:

Figure 4 is a perspective view of a preferred form of sheet metal retainer such as constitutes part of the invention;

Figure 5 is an enlarged perspective view of one of the ribs of the sheet metal retainer;

Figure 6 is a diagrammatic view of the retainer, illustrating a rib in side elevation and opposite ends of the same;

Figure 7 is an inner end elevation of one of the ribs on the sheet metal retainer;

Figure 8 is a partial side view showing how stock is fed to the corrugating and shaping dies;

Figure 9 is a sectional view of the dies, and

Figure 10 is a plan view showing the relation of the dies and stock as it is fed to and leaves the same.

Figure 1:
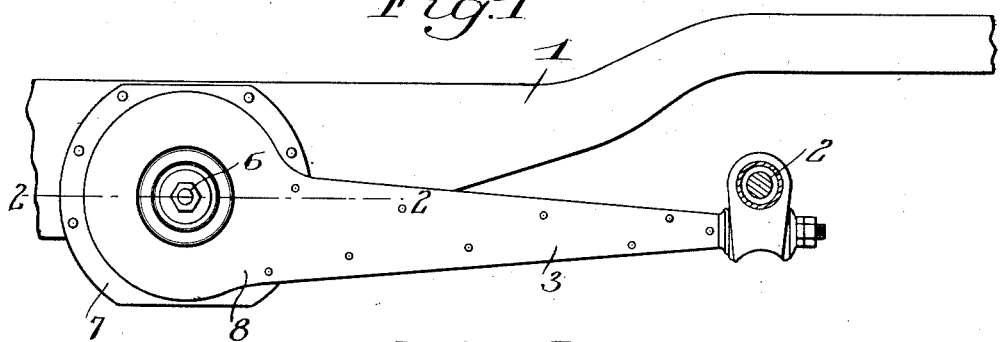
Figure 1 is a partial side elevation of a motor vehicle frame with a suspension of the general type here involved applied thereto.
Figure 3:
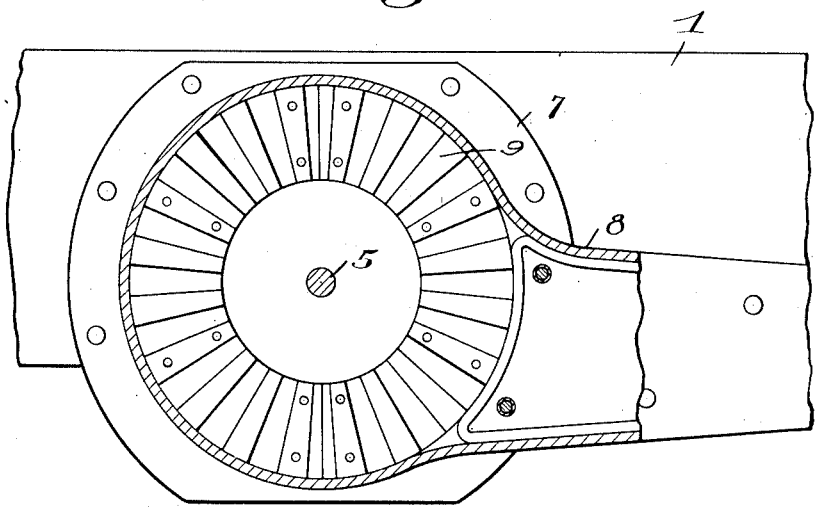
Figure 3 is a vertical sectional view on line 3—3 of Figure 2.

Referring more particularly to the drawings, in which like reference characters refer to the same parts throughout the several views, 1 designates a portion of a motor vehicle frame, 2 is an axle, and 3 is a connecting arm united to the frame at one end through the rubber block 4 and operatively associated with the axle at its other end through a suitable joint, and acting to support the frame.

Figure 2:
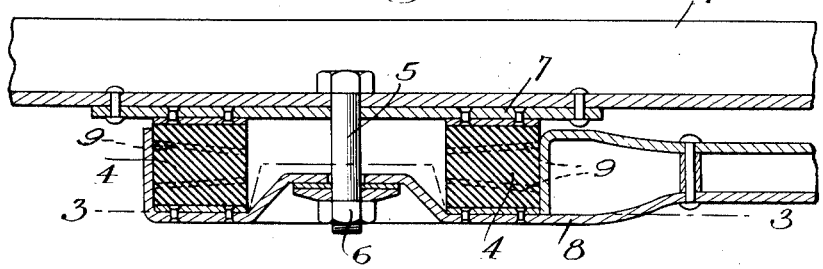
Figure 2 is a horizontal sectional view on line 2—2 of Figure 1.

The rubber block 4 has a groove and rib connection with the connecting arm and frame, being clamped tightly therebetween by bolt 5 and nut 6, and thereby acting to resist relative turning movement of the connecting arm and frame. Connection is had between the rubber block 4 and the frame and connecting arm preferably through sheet metal retainers 9 which are riveted or otherwise fixedly secured to a plate 7 carried by the frame, see Figure 2, and a housing 8 forming part of the connecting arm.

The sheet metal retainer, which is illustrated in Figures 4 to 10, is segmental in form with radially arranged ribs and grooves. Both the ribs and grooves taper from their outer ends 11 inwardly, being narrowest at their inner ends 10. The ribs and grooves are also of greatest height at their inner ends 10 and of least height at their outer ends 11, as shown in Figures 4 to 6, while the walls of the retainer are of substantially uniform thickness at all parts of the ribs and grooves.

This construction results from taking a straight piece of stock, as illustrated at 15, see Figure 10, and feeding it between two rotating dies 12 and 13 which are tapered as shown, and provided with cooperating teeth and grooves, as illustrated in Figures 8 and 9. By employing tapered dies, with an angular relationship between their operative surfaces, such as shown in Figure 9, and suitably tapering the teeth and grooves in the dies, a straight piece of stock is formed into circular or segmental shape with grooves and ribs of correspondingly tapering form.

The rubber block is also formed with tapering grooves and ribs, to which those on the sheet metal retainer, just described, are preferably conjugate. The ribs and grooves on the rubber block have greatest width and least height at their outer ends and greatest height and least width at their inner ends. This arrangement has the advantage of an increased resisting surface of rubber and consequently greater yieldability at the inner ends of the ribs where greatest torque occurs, while the ribs and grooves on the rubber block are wider and higher at their outer ends where the least torque is present. This structure creates great efficiency in the operation of the rubber block and increases the wearing qualities and life of the latter as well. The sheet metal retainer being of substantially uniform thickness throughout is strong and durable, and can be manufactured in a quick and economical fashion.

While the invention has been described with reference to a particular embodiment, it is not confined to the details or arrangements herein shown and described, and this application is intended to cover any modifications or departures coming within the spirit of the improvements or the scope of the following claims.

I claim:

1. In a motor vehicle, the combination with a frame and axle, of a connecting arm having one end joined to the axle, and a rubber block clamped between the opposite end of the connecting arm and frame, said rubber block having on opposite sides a series of radial ribs and grooves and being held by sheet metal retainers of uniform thickness throughout, and having corresponding radial ribs and grooves.

2. In a motor vehicle, the combination with a frame and axle, of a connecting arm having one end joined to the axle, a rubber block clamped between the opposite end of the connecting arm and frame, said rubber block having on opposite sides a series of radially arranged ribs and grooves of greater height at their inner ends than at their outer ends, and sheet metal retainers attached to the frame and arm respectively, and having ribs and grooves co-operating with those on the block.

3. In a motor vehicle, the combination with a frame and axle, of a connecting arm having one end joined to the axle, a rubber block clamped between the opposite end of the connecting arm and frame, said block having a series of radially arranged ribs and grooves which are relatively narrow and high at their inner ends and relatively wide and short at their outer ends, and sheet metal retainers of substantially uniform thickness throughout secured to the frame and connecting arm respectively, said retainers having ribs and grooves conjugate to those on the block, and cooperating therewith.

4. In a motor vehicle, the combination with a frame and axle, of a connecting arm having one end joined to the axle, a rubber block clamped between the opposite end of the connecting arm and frame, said rubber block having on opposite sides a series of radially arranged ribs and grooves of greater height at their inner ends than at their outer ends, and sheet metal retainers attached to the frame and arm respectively, and having ribs and grooves conjugate to those on the block and cooperating therewith.

5. A suspension for a motor vehicle comprising a supporting surface, a corrugated member attached to said supporting surface, and a resilient body having ribs and grooves interlocking with the corrugations of said member.

6. A suspension for a motor vehicle comprising a supporting surface, a corrugated member of uniform thickness throughout attached to said supporting surface, and a resilient body having ribs and grooves interlocking with the corrugations of said member.

In witness whereof, I have hereunto signed my name.

ROBERT A. WEINHARDT.